(12) United States Patent
Yerra et al.

(10) Patent No.: US 9,565,180 B2
(45) Date of Patent: Feb. 7, 2017

(54) EXCHANGE OF DIGITAL CERTIFICATES IN A CLIENT-PROXY-SERVER NETWORK CONFIGURATION

(71) Applicant: Symantec Corporation, Mountain View, CA (US)

(72) Inventors: Srinivas Yerra, Sunnyvale, CA (US); Krists Krilovs, Santa Clara, CA (US); Dharmendra Mohan, Sunyvale, CA (US); Ron Frederick, Mountain View, CA (US); Tammy Green, Provo, UT (US)

(73) Assignee: Symantec Corporation, Mountain View, CA (US)

( * ) Notice: Subject to any disclaimer, the term of this patent is extended or adjusted under 35 U.S.C. 154(b) by 481 days.

(21) Appl. No.: 13/631,646

(22) Filed: Sep. 28, 2012

(65) Prior Publication Data
US 2014/0095865 A1   Apr. 3, 2014

(51) Int. Cl.
*H04L 29/06* (2006.01)
*H04L 9/32* (2006.01)

(52) U.S. Cl.
CPC ......... *H04L 63/0823* (2013.01); *H04L 9/3202* (2013.01); *H04L 9/3265* (2013.01); *H04L 9/3271* (2013.01); *H04L 2209/76* (2013.01)

(58) Field of Classification Search
USPC ............................................ 713/156; 726/12
See application file for complete search history.

(56) References Cited

U.S. PATENT DOCUMENTS

| 7,506,368 B1* | 3/2009 | Kersey et al. .................. 726/12 |
| 7,769,994 B2* | 8/2010 | Peles .............................. 713/153 |
| 2006/0174327 A1* | 8/2006 | Song et al. ....................... 726/3 |
| 2009/0178061 A1 | 7/2009 | Sandoval et al. |
| 2010/0228968 A1* | 9/2010 | Wason et al. ................. 713/156 |
| 2011/0264905 A1* | 10/2011 | Ovsiannikov ................. 713/151 |
| 2013/0145151 A1* | 6/2013 | Brown et al. ................. 713/156 |

OTHER PUBLICATIONS

D. Cooper, S. Santesson, S. Farrell, S. Boeyen, R. Housley, W. Polk, "Internet X.509 Public Key Infrastructure Certificate and Certificate Revocation List (CRL) Profile," IETF, RFC 5280, May 2008.*

(Continued)

*Primary Examiner* — Saleh Najjar
*Assistant Examiner* — Louis Teng
(74) *Attorney, Agent, or Firm* — Holland & Hart LLP

(57) ABSTRACT

Various techniques are described to authenticate the identity of a proxy in a client-proxy-server configuration. The configuration may have a client-side and a server-side SSL session. In the server-side session, if the proxy has access to the private keys of the client, the proxy may select a client certificate from a collection of client certificates and send the selected certificate to the server to satisfy a client authentication request of the server. If the proxy does not have access to the private keys, the proxy may instead send an emulated client certificate to the server. Further, the client certificate received from the client may be embedded within the emulated client certificate so as to allow the server to directly authenticate the client, in addition to the proxy. An emulated client certificate chain may be formed instead of an emulated client certificate. Similar techniques may be applied to the client-side session.

11 Claims, 10 Drawing Sheets

(56) References Cited

OTHER PUBLICATIONS

S. Tuecke, V. Welch, D. Engert, L. Pearlman, M. Thompson, "Internet X.509 Public Key Infrastructure (PKI) Proxy Certificate Profile" IETF, RFC 3280, Jun. 2004.*
F. Martin, "SSL Certificates HOWTO" Linux Documentation Project, Revision v0.5, Oct. 2002.*
C. Sanders, "Understanding Man-In-The-Middle Attacks- Part 4: SSL Hijacking", dated Jun. 9, 2010, 15 pages.
"Cloak and Dagger: Man-In-The-Middle and Other Insidious Attacks", downloaded Sep. 11, 2012, 28 pages.
"Understanding Digital Certificates", dated May 19, 2005, 5 pages.
"Digital Certificates", downloaded Sep. 17, 2012, 2 pages.
L. MacVittie, "Online Only: The Anatomy of an SSL Handshake", downloaded Sep. 17, 2012, 2 pages.
"An Overview of the SSL Handshake", downloaded Sep. 17, 2012, 3 pages.
"How SSL provides authentication", downloaded Sep. 17, 2012, 2 pages.
"How certificate chains work", downloaded Sep. 17, 2012, 1 page.
"Certificate Chaining", downloaded Sep. 17, 2012, 1 page.
J. Jarmoc, "SSL/TLS Interception Proxies and Transitive Trust", presented at Black Hat Europe on Mar. 14, 2012, 21 pages.
"Technology Primer: Secure Sockets Layer (SSL)", Blue Coat, downloaded Sep. 13, 2012, 25 pages.
E. Cheng, "An Introduction to Mutual SSL Authentication", dated Feb. 8, 2012, 9 pages.
J. Spera, "SSL Client Authentication: It's a matter of trust", dated Mar. 2, 1998, 7 pages.

* cited by examiner

EXCHANGE OF DIGITAL CERTIFICATES IN A CLIENT-PROXY-SERVER NETWORK CONFIGURATION

FIELD OF THE INVENTION

The present invention relates to methods for establishing SSL sessions in a client-proxy-server network configuration, and more particularly to methods for exchanging digital certificates so as to allow authentication of one or more of the client, proxy and server.

BACKGROUND

The secure sockets layer (SSL) protocol (hereinafter, "SSL") provides secure communication between two devices, typically a client and a server, through authentication of one or more of the devices, encryption of the communication to prevent eavesdropping, and an integrity check to prevent modification of the communication while it is in transit between the two devices. Much of the discussion below also applies to the transport layer security (TLS) protocol, the successor of SSL, other protocols that use X.509 certificates, and other protocols that use the Public Key Infrastructure (PKI), although for conciseness, the following discussion will focus on SSL.

As depicted in FIG. 1, SSL begins with a handshake between the client 10 and the server 30, and is followed by a bulk data transfer between the two devices. In the handshake, the client 10 sends a "client hello" message (i.e., a connection request) that lists the ciphers supported by the client (step 102). The server responds with a "server hello" message that records the strongest cipher (out of the client's list) that is supported by the server (step 104). In addition, the server transmits a digital certificate, which binds an identity of the server (e.g., the server name) to a public key of the server (step 104). The server certificate is typically issued by a certificate authority (CA) which certifies the authenticity of the server certificate by signing the server certificate with its private key.

In the case of mutual authentication, the server may also require client authentication (e.g., required for some on-line banking operations), and if so, sends a client certificate request to the client (step 104). The client verifies that the server certificate is valid by verifying the CA's signature (e.g., decrypting the encrypted CA signature with the CA's public key), and verifying that the CA is listed in the client's list of trusted CAs (step 106). If the certificate is valid, the client generates a master secret (also called a secret key), encrypts it with the server's public key, and sends the result to the server (step 108). If the server requests client authentication, the client also sends the client's digital certificate, which binds an identity of the client (e.g., the client name) to a public key of the client (step 108). The client certificate is also typically issued by a certificate authority (CA) which certifies the authenticity of the client certificate by signing the client certificate with its private key.

If the server receives a client certificate, it verifies the CA's signature on the client certificate with the CA's public key, and also verifies that the CA that issued the client certificate is included in the server's list of trusted CAs (step 110). The server also decrypts the master secret with its private key (step 110). The client proves to the server that it holds the private key corresponding to the client certificate with a certificate verify message, which has a hash signed with the client's private key. The hash is computed on all the messages exchanged between the client and server until then, and therefore is a known value to both the client and server.

The client and server then convert the master secret to a set of symmetric keys called session keys. The session keys are known to both the server and client and are used to encrypt and decrypt the subsequent communication between the server and client. The SSL handshake concludes and is followed by a bulk data transfer (step 112) over the communication link encrypted by the session keys.

While SSL allows two parties' communication to be protected against interception from eavesdroppers, the same security mechanism also prevents any attempts by an authorized party (e.g., network administrator) to filter and block the communication of inappropriate and/or not permitted information (i.e., adult content, classified information, etc.) As a result, proxies have been specially designed to filter even encrypted communication between a client and server, often only after obtaining the client's and/or server's permission to do so. Examples of such proxies include Web proxies, data loss prevention (DLP) systems, specialized threat detection solutions, and network intrusion prevention systems (NIPS). These proxies essentially break an SSL connection into two SSL connections: a client-side SSL session between client 10 and proxy 20, and a server-side SSL session between proxy 20 and server 30, as depicted in FIG. 11. These proxies are able to decrypt the encrypted communication and filter the communication in clear text between a client and a server.

While the filtering of encrypted communication by a proxy exists today, there are certain challenges, related to the authentication of devices, created by having a proxy filter SSL communication. These challenges are addressed by embodiments of the present invention, as described below.

SUMMARY OF THE INVENTION

In various embodiments of the invention, in response to a client authentication request, a proxy provides an emulated client certificate or an original client certificate to the server. In the instance where an original client certificate is provided, the client certificate is first selected from a collection of client certificates based on a defined policy. The policy may take as inputs one or more of an identity of the client, a group that the client belongs to, a URL of the server, a network address of the server, field values of the server certificate, etc.

In another embodiment, to permit 3-party authentication, the original client certificate is embedded within an emulated client certificate. In addition to verifying the proxy through the emulated client certificate, the server can directly authenticate the client through the embedded client certificate.

In yet another embodiment, an emulated client certificate may be signed by a private key of the client. As long as the server trusts the original client certificate, it will be able to trust the emulated client certificate.

In yet another embodiment, an entire client certificate chain may be emulated, and further, original client certificates may be embedded within the emulated client certificate chain.

These techniques, described with respect to emulated client certificates, may similarly be applied to emulated server certificates.

These and further embodiment of the present invention are discussed herein.

BRIEF DESCRIPTION OF THE DRAWINGS

The present invention is illustrated by way of example, and not limitation, in the figures of the accompanying drawings in which.

DETAILED DESCRIPTION OF THE INVENTION

Figure 1:
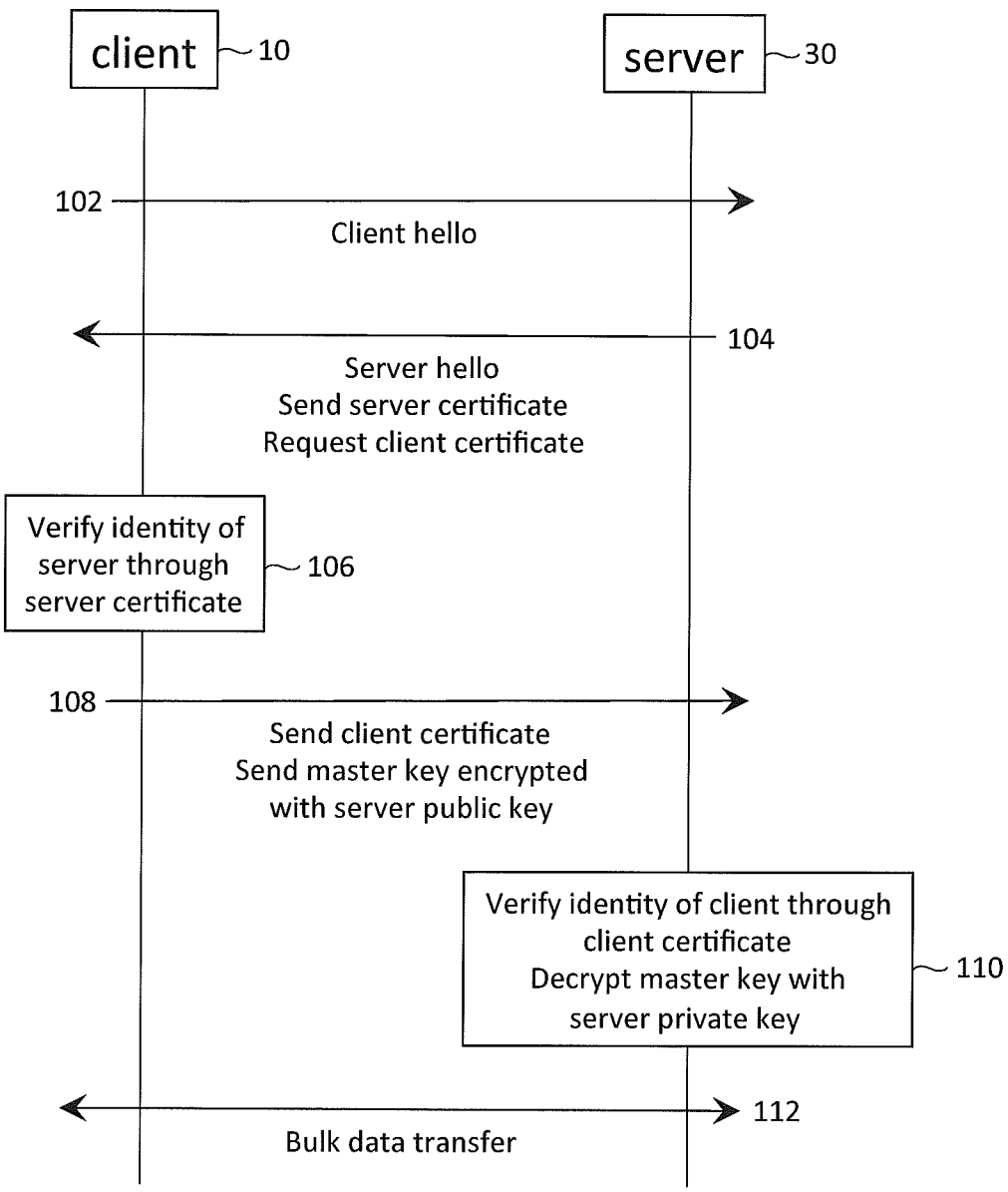
FIG. 1 depicts the transmission of messages between a client and server over an SSL session.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Readers should recognize that various embodiments of the present invention may be implemented with the aid of computer-implemented processes or methods (a.k.a. software, programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, terms such as software, programs, routines, scripts and the like, as used herein, are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with any computer system configuration, including personal computers, workstations, hand-held devices, multiprocessor systems, microprocessor-based, digital signal processor-based or other programmable consumer electronics, network computers that employ thin client architectures, minicomputers, mainframe computers, and the like. The invention can also be practiced in distributed computing environments where tasks are performed by remote processing devices that are linked through a communications network.

Figure 2:
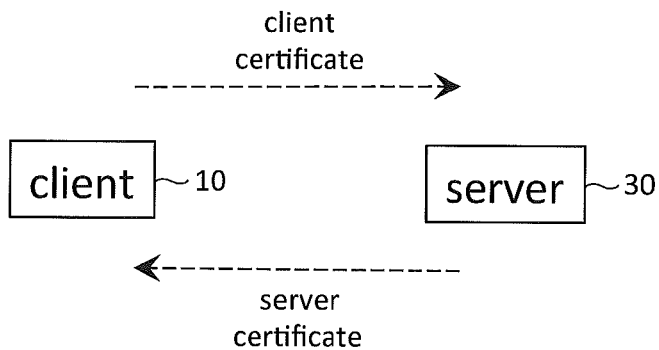
FIG. 2 depicts the exchange of digital certificates between a client and server.
Figure 3:
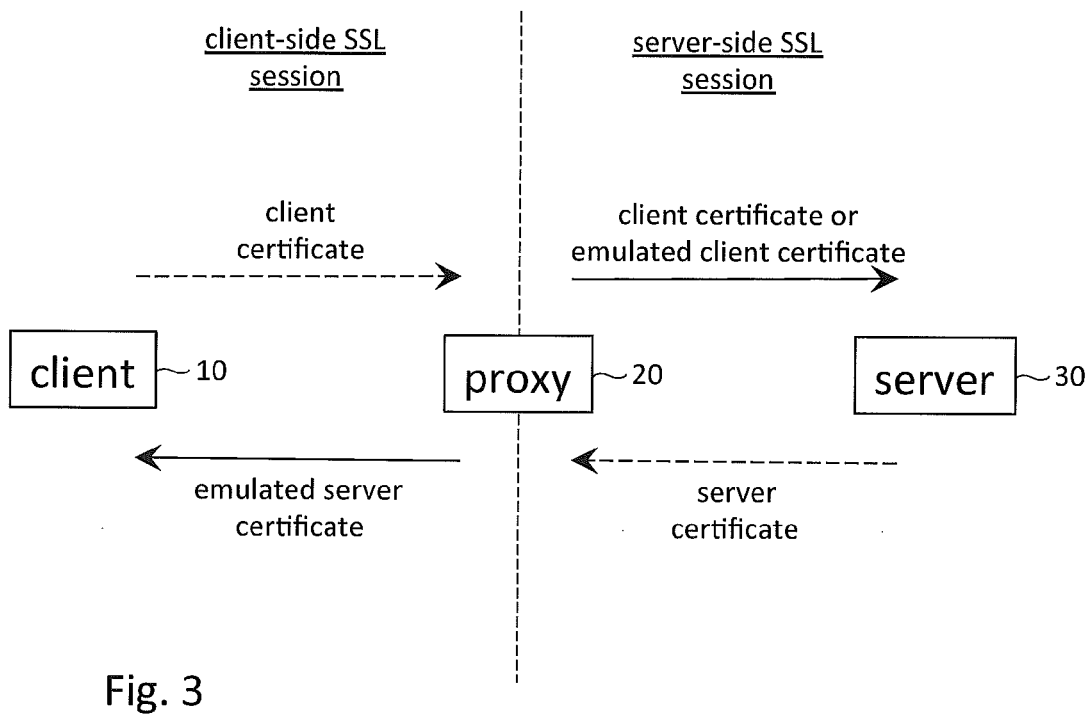
FIG. 3 depicts the exchange of digital certificates between a client, proxy and server, in accordance with one embodiment of the invention.

FIG. 2 depicts a typical exchange of digital certificates between the client 10 and the server 30. In mutual authentication, the server sends the client a server certificate for the client to authenticate the server, and the client sends the server a client certificate for the server to authenticate the client. In some communication networks, client authentication is not required, so for these networks, the client certificate is not transmitted. FIG. 3 depicts an exchange of digital certificates when a proxy 20 is communicatively coupled to the client 10 and server 30. Two certificate exchanges (depicted in dotted arrows) are essentially unchanged from the configuration of FIG. 2. The client, when presented with a client certificate request from the proxy, transmits a client certificate to the proxy, just as it would have previously transmitted same to the server. The server, when presented with a server certificate request from the proxy, transmits a server certificate to the proxy, just as it would have previously transmitted same to the client.

Two certificate exchanges in FIG. 3, originating from the proxy (depicted in solid arrows), have no counterpart in the configuration of FIG. 2, and require more consideration. If the server requests client authentication in the configuration of FIG. 3, prior literature states that such request typically causes the session to bypass inspection; in other words, communication between the client and server cannot be intercepted and inspected by the proxy. See, e.g., "SSL/TLS Interception Proxies and Transitive Trust" article by Dell® Secure Works. One embodiment of the invention addresses this shortcoming of the prior literature by having the proxy transmit the original client certificate (i.e., that received from the client by the proxy) to the server, if the proxy has access to the private key corresponding to the public key listed in the original client certificate. If the proxy does not have access to the client private key, the proxy cannot simply present the original client certificate to the server. If it does, it will be unable to complete the SSL handshake with the server, because at some point in the SSL handshake the proxy will need to use the client private key to sign a hash associated with a certificate verify message.

In the instance that the proxy does not have access to the client private key, the proxy can create an emulated client certificate to send to the server, in accordance with one embodiment of the invention. An emulated client certificate is created at the proxy by generating a key pair (i.e., private and public key pair), including the newly generated public key into an emulated certificate (instead of including the public key of the original client certificate) and then having a CA sign the emulated certificate. The proxy can be the trusted CA and sign the emulated certificate, if the CA keys are available to it. Alternately, the emulated certificate can be signed by a responding inline/external CA using a secure certificate signing protocol, such as the simple certificate enrollment protocol (SCEP). Both of these embodiments (i.e., retransmission of original client certificate and transmission of emulated client certificate) are described in more detailed below.

The other certificate exchange that requires more consideration in FIG. 3 occurs when the client sends the proxy a connection request, which implicitly includes a server certificate request. In this case, the literature describes that since the proxy does not have access to the server private key, the proxy needs to generate a new certificate and key pair to respond to the implicit server certificate request. See, e.g., "SSL/TLS Interception Proxies and Transitive Trust" article by Dell® Secure Works. The present invention proposes other techniques for the proxy to respond to a connection request from the client, as further described below.

Forwarding Original Client Certificate

Figure 4:
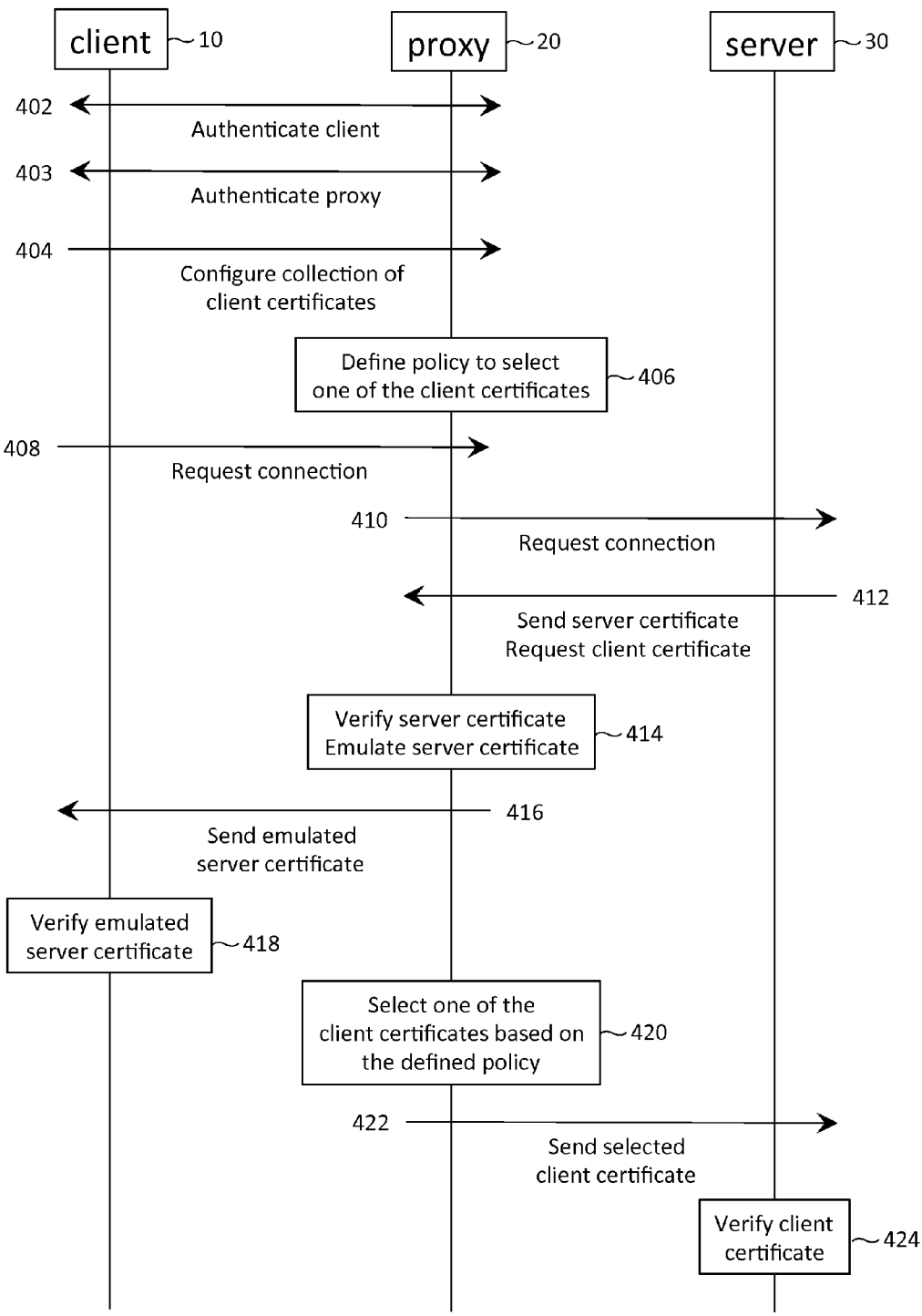
FIG. 4 depicts a process of establishing an SSL connection between a client and proxy and an SSL connection between the proxy and a server, in which client certificates are selected at the proxy, in accordance with one embodiment of the invention.

FIG. 4 depicts one embodiment of the invention in which original client certificate(s) (and their corresponding client private keys) are first collected by the proxy from various clients (i.e., various clients whose communication is being managed by the proxy). A client certificate paired with its corresponding private key is defined as a key ring, and key rings are stored in certain data structures, such as key lists, as further described below. When the server sends a client certificate request to the proxy, the proxy selects one of the client certificates according to a defined policy, and transmits the selected client certificate to the server.

As depicted in FIG. 4, the proxy first authenticates the client (step 402). One possible authentication method is client certificate authentication, in which the client sends its client certificate to the proxy, and the proxy verifies a signature generated by the CA's private key. The proxy may also verify that the CA listed in the certificate is included in a list of trusted CAs. The client proves to the proxy that it holds the private key corresponding to the client certificate with a certificate verify message, which has a hash signed with the client's private key. The hash is computed on all the messages exchanged between the client and proxy until then, and therefore is a known value to both the client and proxy. Another authentication method is SAML (Security Assertion Markup Language), an XML-based data format for exchanging authentication and authorization data between parties. While client certificate authentication and SAML have been mentioned as possible authentication methods, any other authentication method that the proxy supports may also be used.

The client may authenticate the proxy by verifying the proxy's certificate when connecting to the proxy (step 403). The proxy may have a certificate that it presents for its administration/management connections. This can be the same as the proxy's CA certificate that is used to later sign the emulated server certificates.

Upon successfully authenticating the proxy, the client may load one or more client certificates (along with their associated private keys) to the proxy (step 404). Because the user names, roles, permissions, CAs trusted by the servers, etc. can be different for each server connected to the client, the client could have multiple client certificates, for example, one client certificate corresponding to each server connected to the client. The client could also have, for example, a client certificate corresponding to each service offered by the server. The loading operation can and usually is performed by an administrator once for all the client certificates of all users. The certificates and the private keys can be cryptographically encrypted either on the proxy or on another appliance with secure network access to prevent an attacker from stealing same. Certificates and private keys can ultimately be saved using a hardware security module (HSM) in the proxy. Alternatively, certificates and private keys may be also saved in an LDAP/Active directory, etc.

Next, an administrator at the proxy defines a policy to select one of the client certificates (step 406) based on one or more input factors, such as an identity of the client, a group that the client belongs to, a URL of the server, a network address of the server, and field values of the server certificate. Other input factors include the network address of the client, the type of authentication used by the client, the type of service provided by the server, client certificate field values if client certificate authentication is used between client and proxy, etc. In one embodiment, the policy is defined as follows. An administrator loads one or more client certificates and their corresponding private keys to the proxy, using, for example, command line interface (CLI) commands, a user interface (UI), or a batch upload operation. The administrator may create a key ring for each client certificate and private key pair. The key rings may further be organized into key lists. For example, key rings used with a specific web-service (such as Gmail, a stock brokerage account, a utility account, etc.) can be grouped together into one key list. Extractors are created so that specific key rings in a key list can be matched with specific user(s) of transactions. In this context, a user is someone that can be identified based on the (combination of) input factors described above. An extractor may take as input any pattern of strings and certificate fields in order to uniquely match a key ring to a user or user group.

If the client certificates are signed by one or more intermediate CAs, the administrator may need to import the certificates of those intermediate CAs to the proxy. Further, administrators may need to enable proxy authentication, if this is not enabled yet. This step is only needed if the proxy authentication credentials are used to select key rings. Administrators may add policy rules to select key rings either through CLI, or Visual Policy Manager (VPM).

The following is an example of a certain organization of certificates and a policy to select a certificate within that organization. Three users (i.e., user1, user2, and user3) belonging to a group (i.e., group1) can be authenticated using proxy authentication. In the example, there are three websites that require client certificate authentication: abc.com, def.com and xyz.com. Each user has client certificates to access abc.com with the following subjectNames:

CN=user1, O=myOrg, ST=myState, C=myCountry
CN=user2, O=myOrg, ST=myState, C=myCountry
CN=user3, O=myOrg, ST=myState, C=myCountry User1 and user2 have client certificates to access def.com with the following SubjectAltNames:

email:user1@mycompany.com
email:user2@mycompany.com

There is only one client certificate to access xyz.com with subjectName "CN=defUser, O=myOrg, ST=myState, C=myCountry".

An administrator can organize the certificates as follows:
  client certificates for abc.com can be loaded into keyrings, KR_abc_user1, KR_abc_user2, KR_abc_user3 and grouped together in a keylist, KL_abc, with extractor $(subject.CN)
  client certificates for abc.com can be loaded into keyrings, KR_def_user1 and KR_def_user2, and grouped together in a keylist, KL_def, with extractor $(SubjectAltName.email)
  client certificate for xyz.com can be loaded into a keyring KR_xyz Then, the administrator can write the following policy rules:
  url=abc.com server.connection.client_keyring(KL_abc, $(user))—for connections to abc.com, selects a keyring from keylist, KL_abc, such that the common name from keyring's subject matches the user of the transaction.
  url=abc.com group=group1 server.connection.client_keyring(KL_abc, $(user))—same as above but additionally restricts a keyring selection to users from group1.
  url=def.com group=group1 server.connection.client_keyring(KL_def $(user)@mycompany.com)—for connections to def.com, selects a keyring from KL_def such that the email address from keyring's SubjectAltName matches the email address derived from the user of the transaction. This rule only applies to users from group1. Note, requests from user3 will fail to select a client keyring and so user3 cannot access def.com
  url=xyz.com server.connection.client_keyring(KR_xyz)—for connections to xyz.com, allow all users to use the keyring KR_xyz. All users will share the "defUser" credentials when accessing xyz.com
  url=xyz.com group=group1 server.connection.client_keyring(KR_xyz)—same as above but restricts access to xyz.com to users from group1.

In another embodiment, a user's identity is not revealed to the proxy. Instead, the proxy may select a certificate for the user based on a group that the user belongs to.

In yet another embodiment, a destination host is used to select a key list and an extractor is used to select a key ring within the key list that corresponds to a user.

In yet another embodiment, a key list may contain only a single key ring. Therefore, after selection of a key list based on, for example, a particular destination host, all users will receive the same key ring.

After the policy has been defined, the SSL handshake between the client and proxy and the SSL handshake between the proxy and the server proceed as follows. It is noted the following explanation assumes mutual authentication is required between the client and proxy and also between the proxy and the server, although certain steps may be omitted if, for example, only server authentication is required. First, the client sends a connection request to the proxy (step 408). Upon receipt of the client's connection request, the proxy sends a connection request to the server (step 410). In response to the proxy's connection request, the server sends its certificate (step 412). If the server requires client authentication, the server additionally sends a client certificate request (step 412). Upon receipt of the server certificate, the proxy verifies the server certificate (step 414). If the server certificate is valid, the proxy generates an emulated server certificate (step 414), and sends the emulated server certificate to the client (step 416). The client verifies an identity of the proxy by validating the emulated server certificate (step 418). Mutual authentication between the client and the proxy is now concluded.

Finally, the proxy may need to respond to the server's client certificate request if the server has requested client authentication in order to complete mutual authentication between the proxy and the server. As described above, the proxy selects one of the client certificates from a collection of client certificates based on a defined policy (step 420). The proxy then transmits the selected client certificate to the server (step 422). Finally, the server verifies the client certificate (step 424), which completes the mutual authentication process between the proxy and server.

Authentication Via Emulated Client and Server Certificates

Figure 5:
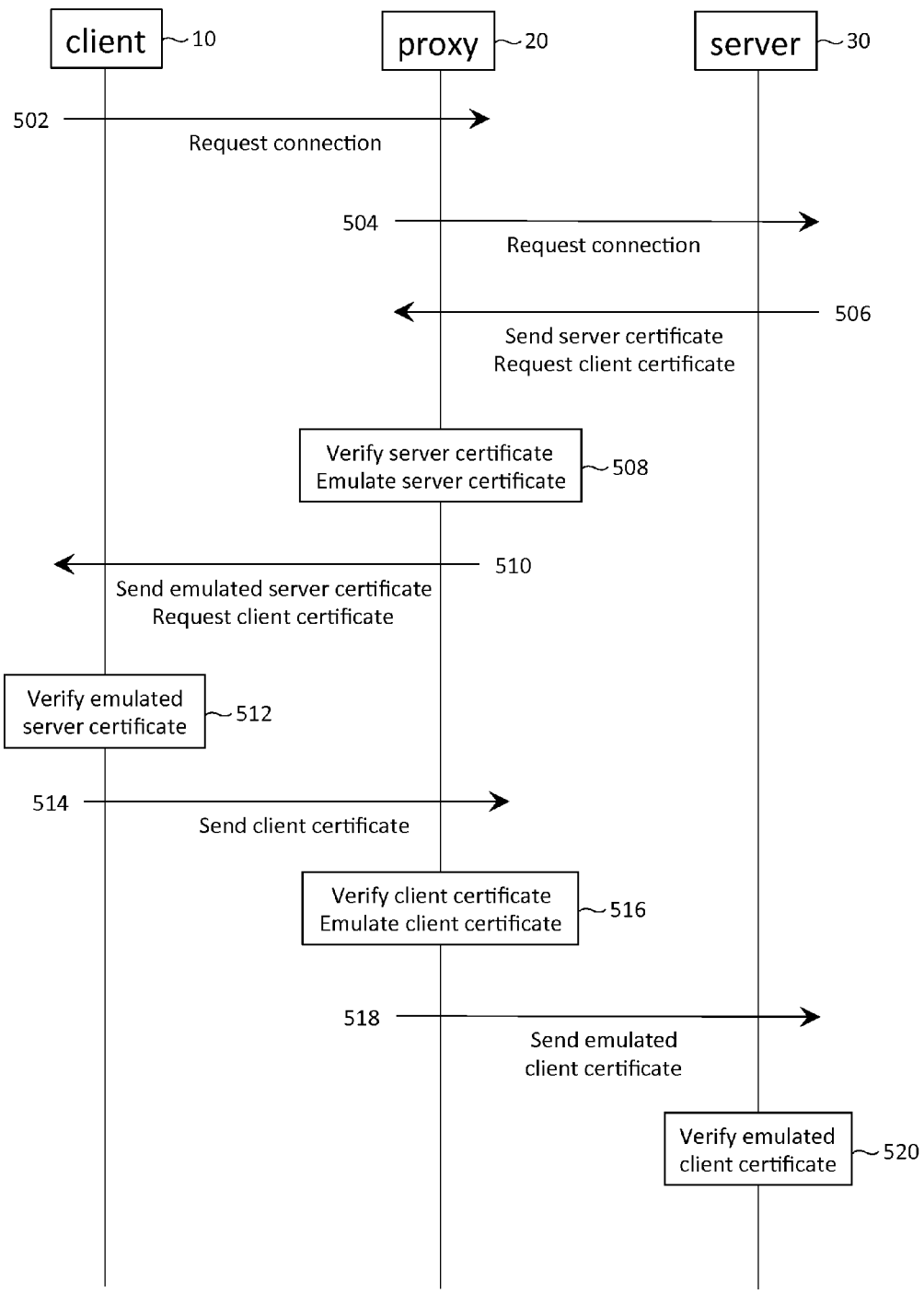
FIG. 5 depicts a process of establishing an SSL connection between a client and proxy and an SSL connection between the proxy and a server, in which client certificates are emulated at the proxy, in accordance with one embodiment of the invention.

FIG. 5 depicts a process to establish SSL sessions between a client and proxy and between a proxy and server using emulated client certificates and emulated server certificates. First, the client sends a connection request to the proxy (step 502). Upon receipt of the client's connection request, the proxy sends a connection request to the server (step 504). In response to the proxy's connection request, the server sends its certificate (step 506). If the server requires client authentication, the server additionally sends a client certificate request (step 506).

The proxy verifies the identity of the server via the server certificate (step 508). If the server certificate is valid, the proxy generates an emulated server certificate (step 508), and sends the emulated server certificate to the client (step 510). If the proxy requires client authentication, the proxy additionally sends a client certificate request (step 510). The client verifies the emulated server certificate (step 512). If the client receives a client certificate request, the client sends a client certificate to the proxy (step 514). The proxy then verifies the client certificate (step 516). The mutual authentication process between the client and the proxy is now finished.

To conclude the authentication between the proxy and server, the proxy may need to respond to the server's client certificate request if the server has requested client authentication. The embodiment depicted in FIG. 5 assumes that the proxy does not have access to the private key of the client. Therefore, the proxy must generate an emulated client certificate (step 516). The emulated client certificate may additionally be signed by the private key of the proxy and/or a private key of a CA. The signed emulated client certificate is then transmitted to the server, where it is verified (step 520). The server trusts the CA that signed the emulated client certificate, so upon successful verification of the CA's signature, the emulated client certificate is verified. In one embodiment, the proxy could be acting as that CA, or in another embodiment, there could be another external CA service. In either case, the server needs to trust the CA. This concludes the mutual authentication process between the proxy and the server.

3-Party Authentication

As discussed above, the proxy can create an emulated server certificate in response to a server certificate request from the client. The solution that exists today is to copy certificate fields, such as the "Validity", "Subject" and "Subject Alternative Name" fields, from the server certificate to the certificate that is emulated by the proxy. However, an emulated server certificate omits much of the information in the original server certificate so, in some instances, the client may not have sufficient information to determine whether it can trust the server. For example, all other fields besides the "Validity", "Subject" and "Subject Alternative Name" fields, such as the "Issuer" and signature fields, are typically not copied.

In one embodiment of the invention, the server certificate is embedded within the emulated server certificate. This allows the client to verify the server certificate as it was previously presented to the proxy by the server. In one embodiment, the server certificate is embedded in the nsComment field of an X.509 Certificate as a PEM blob. However, the embedded certificate need not be a PEM blob, and can be in a DER format or other format. Further, the X.509 field used for embedding the original server certificate need not be nsComment; it can be any other field or a new X.509 extension.

The server certificate embedded within an emulated server certificate allows the client to directly authenticate the server in addition to the proxy. This offers the client a greater degree of security as compared to prior approaches in which the client endpoint could never authenticate the identity of the server and instead had to rely on the proxy's identity provided through an emulated server certificate. See, e.g., "SSL/TLS Interception Proxies and Transitive Trust" article by Dell® Secure Works.

Further, similar techniques may be applied to an emulated client certificate in which the original client certificate is embedded into the emulated client certificate. In this case, the server can authenticate not only the proxy through the emulated client certificate, but also can directly authenticate the client through the embedded client certificate.

Figure 6:
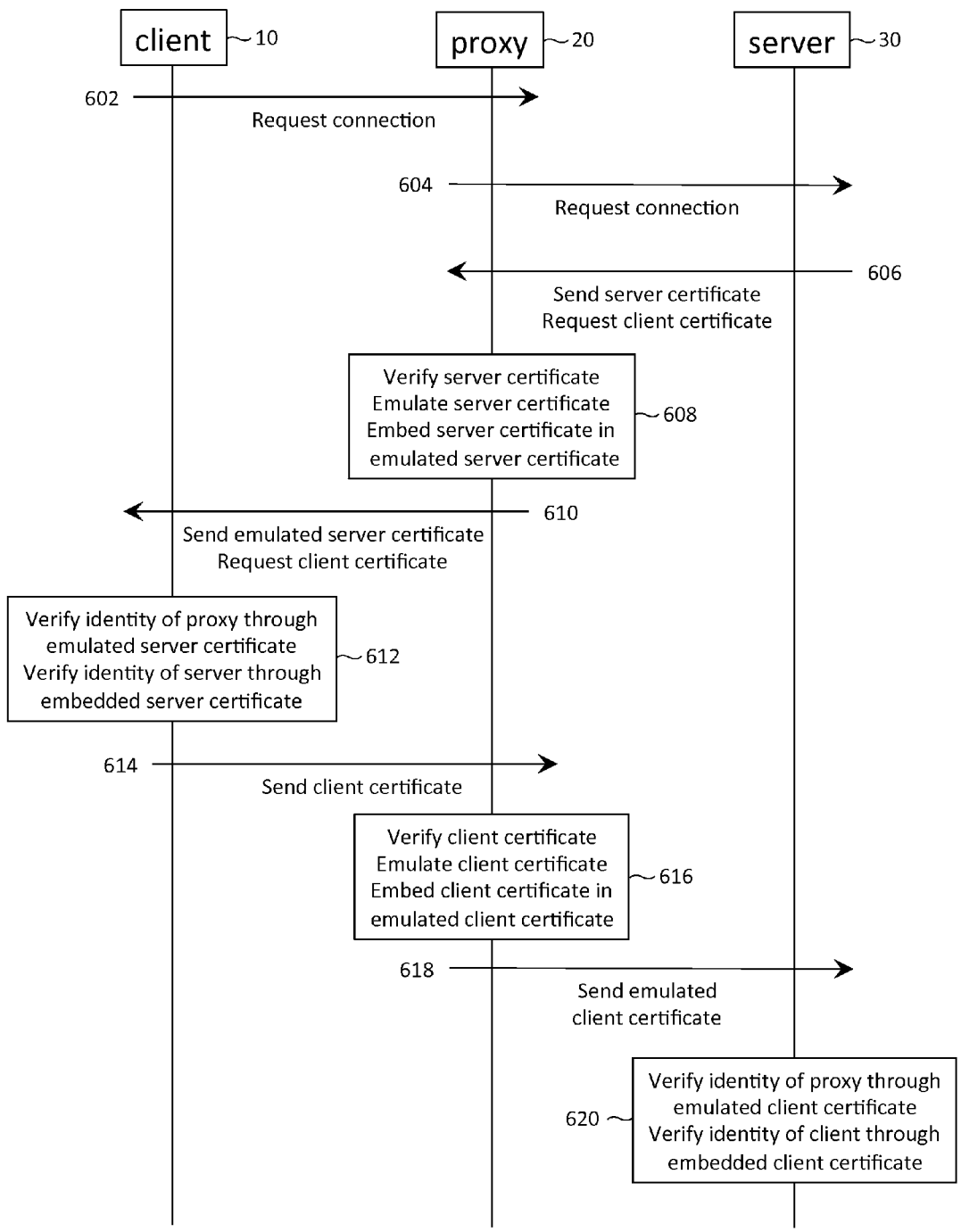
FIG. 6 depicts a process of establishing an SSL connection between a client and proxy and an SSL connection between the proxy and a server, in which certificates are embedded within emulated certificates, in accordance with one embodiment of the invention.

A 3-party authentication process for SSL is now described in more detail. As described above, the 3-party authentication process allows the client to authenticate not only the proxy, but also the server, and allows the server to authenticate not only the proxy, but also the client. As depicted in FIG. 6, the client requests a connection from the proxy (step 602). The proxy in turn requests a connection from the server (step 604). The server replies to such request with a server certificate, and, if client authentication is required, also requests a client certificate (step 606).

The proxy then verifies an identity of the server through the server certificate (step 608). If the server certificate is valid, the proxy emulates the server certificate based on the server certificate (step 608), and to allow for 3-party authentication, further embeds the original server certificate in the emulated server certificate (step 608). The proxy sends the emulated server certificate (step 610) and, if client authentication is required, also sends a client certificate request to the client (step 610).

The client verifies an identity of the proxy through the emulated server certificate (step 612). The client additionally verifies an identity of the server through the embedded server certificate (step 612). If the client previously received a client certificate request, the client sends its certificate to the proxy (step 614).

If client authentication is required, the proxy verifies the client certificate (step 616). If the client certificate is valid, the client emulates the client certificate based on the client certificate (step 616), and to allow for 3-party authentication, the proxy further embeds the original client certificate in the emulated client certificate (step 616). The proxy then sends the emulated client certificate to the server (step 618).

If client authentication is required, the server verifies an identity of the proxy through the emulated client certificate (step 620). To complete the 3-party authentication, the server further verifies an identity of the client through the embedded client certificate (step 620).

To summarize, in 3-party authentication, the client has authenticated both the proxy and server, the proxy has authenticated both the client and server, and the server has authenticated both the client and the proxy, yielding a total of 6 verification steps. While providing a greater degree of security, the increased number of verification steps adds to the processing time of the handshake. Therefore, in other embodiments, some of these verification steps may be omitted for computational efficiency.

While the discussion so far has focused on embedding a certificate within an emulated certificate, other related signed entities may also be embedded into an emulated certificate, such as an Online Certificate Status Protocol (OCSP) response. If an OCSP response is embedded within an emulated certificate, a web browser may validate the OCSP response in addition to verifying the emulated certificate.

Signing Emulated Certificates

Figure 7:
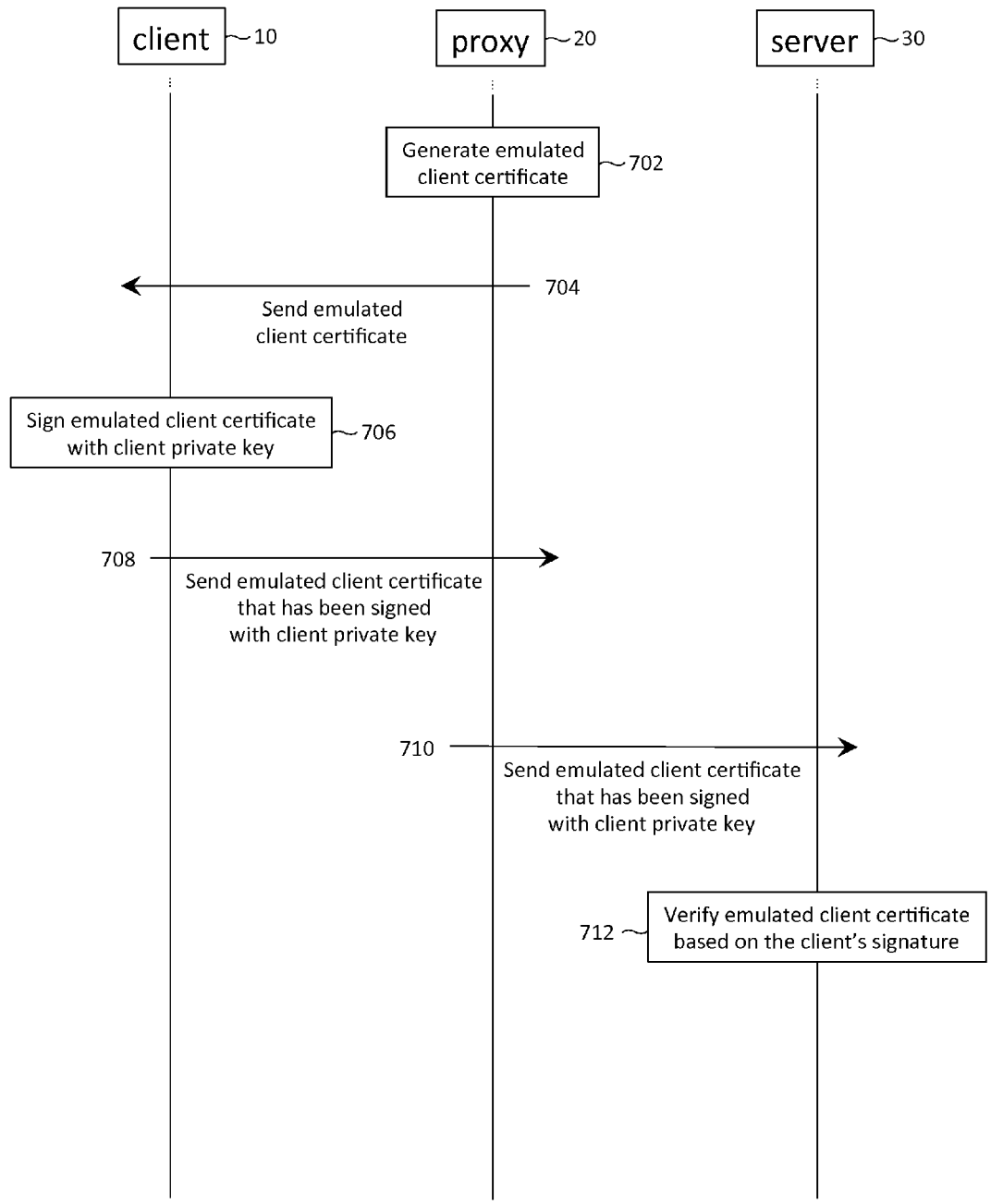
FIG. 7 depicts a process of signing an emulated client certificate with the client private key, in accordance with one embodiment of the invention.

In the discussion above, certificates emulated at the proxy may be signed by a trusted CA. In another embodiment, emulated certificates may also be signed by the server or client. As shown in the portion of a handshake depicted in FIG. 7, an emulated client certificate generated at the proxy (step 702) may be signed with the original client certificate (i.e., private key associated with the original client certificate). The emulated certificate is presented to the client for signing using a secure protocol such as SCEP, SSL, HTTPS, etc. (step 704). The client signs the emulated certificate with the private key associated with the client certificate using a software module pre-installed or delivered to the client by the proxy (step 706). Specifically, a software module at the client may retrieve the private key associated with the client certificate and cryptographically sign the emulated client certificate. It is noted that the client needs to trust and verify the proxy certificate before it signs the emulated client certificate, so typically the signing of the emulated client certificate occurs after the proxy has presented its proxy certificate to the client. The signed certificate is then returned to the proxy (step 708), which in turn presents it to the server, when requested (step 710). Finally, the server verifies the emulated client certificate based on the client's signature (step 712). As long as the server trusts the client certificate (which is the case without the proxy in between client and server), it will be able to trust the emulated client certificate signed by the client. Therefore, the server need not explicitly trust the CA (e.g., proxy CA or another external CA) signing the emulated client certificate as in the earlier cases.

Figure 8:
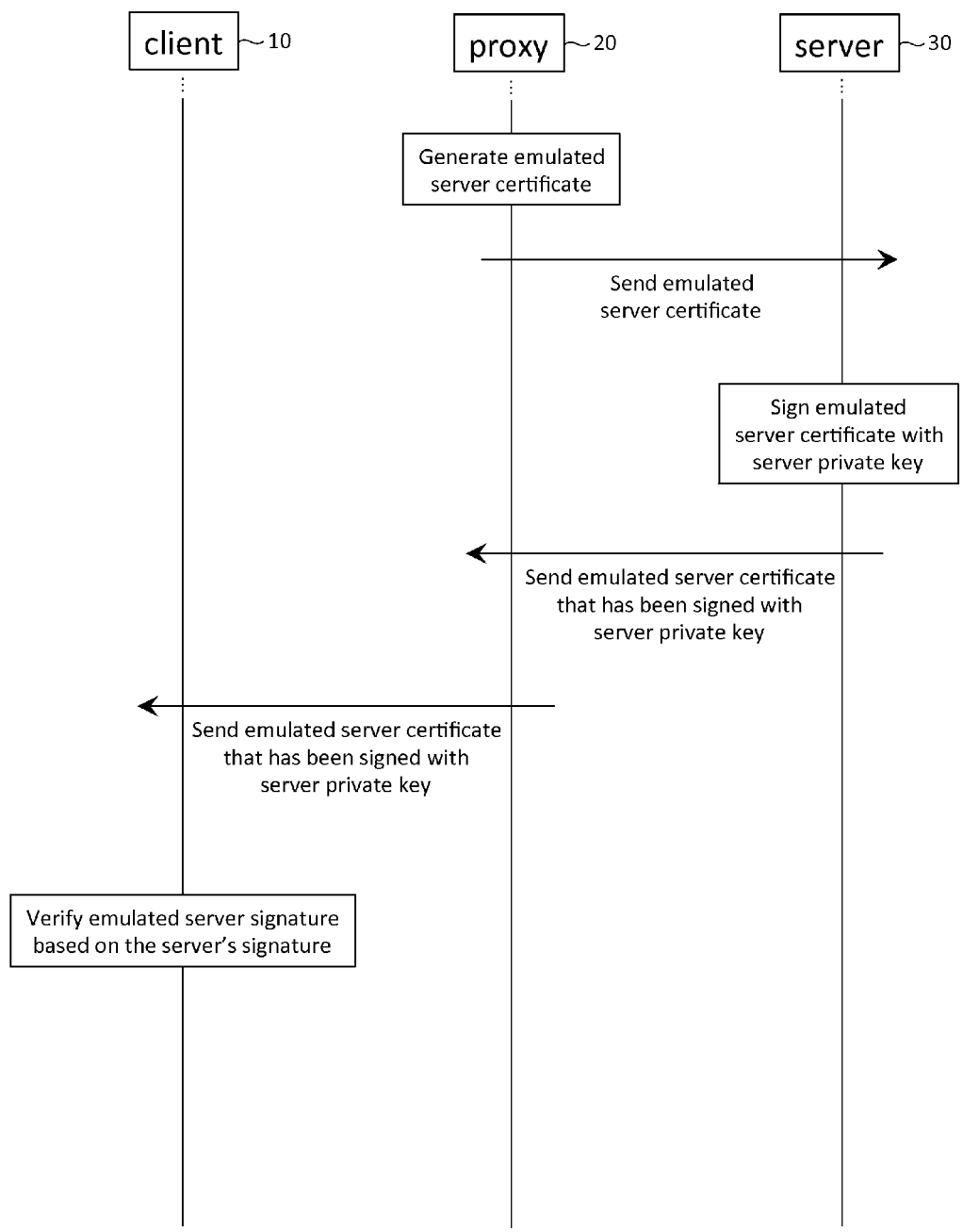
FIG. 8 depicts a process of signing an emulated server certificate with the server private key, in accordance with one embodiment of the invention.

Similar techniques may be applied to an emulated server certificate, as depicted in FIG. 8. The steps are very similar to those described in FIG. 7, and therefore the associated description will not be repeated.

Emulating a Chain of Certificates

While not described so far, an entity may send a chain of certificates, not just a single certificate, in order to demonstrate its identity to another entity. In the certificates described above, it was assumed the CA that signs an entity's certificate was trusted by the receiving entities (i.e., entity receiving signed certificate). This, however, may not always be the case. In general, a certificate may be signed by an intermediate CA that is untrusted by the receiving entity. In these instances, a certificate of the untrusted intermediate CA may be signed by another untrusted intermediate CA along a certificate chain, and so on, until the certificate of an untrusted intermediate CA in the certificate chain is eventually signed by the root CA, which is trusted by all entities. The root CA certificate is self-signed, meaning that the root CA signs its own certificate, and need not require any other entity to certify its certificate. In verifying a chain of certificates, all certificates within the chain must be verified until the root CA is reached.

In one embodiment, entire certificate chains are emulated in a similar manner to the emulation process described above. However, for certificate chains, each certificate in the original certificate chain needs to be emulated. Specifically, when emulating a chain of certificates, a proxy creates a new valid chain of certificates, whose root CA (entity that owns the top-most certificate and the private key of the top-most certificate in the chain) is trusted by the receiving entity explicitly. All the intermediate certificates created by the proxy are given the right to sign certificates, thus making the whole chain valid.

A certificate chain may more specifically be a server certificate chain or a client certificate chain. Therefore, in response to a connection request from the client (with an implicit server authentication request), a proxy may emulate a server certificate chain received from the server. Likewise, in response to a client authentication request, a proxy may emulate a client certificate chain received from the client.

In the instance where a client (e.g., browser of client device) receives an emulated server certificate chain from the proxy, it can verify the certificate chain in a similar manner to how the client typically verifies a certificate chain from a server.

In one embodiment, certificates from the original certificate chain may also be embedded in an emulated chain of certificates to allow 3-party authentication. The following is an example that illustrates the construction of an emulated chain of certificates with embedded certificates. Let $c[1]$, $c[2], \ldots, c[n]$ be the chain of original certificates received such that $c[i]$ is signed with $c[i+1]$, for $i=1 \ldots n-1$. The $c[i]$ "Issuer" is equal to $c[i+1]$ "Subject" for $i=1 \ldots n-1$. There are 2 subcases depending on whether $c[n]$ is a self signed certificate or not. If $c[n]$ is not a self-signed certificate (i.e., subcase 1), a chain of emulated certificates $c'[1], c'[2], \ldots, c'[n], c'[n+1]$ is created such that $c'[i]$ is signed with $c'[i+1]$, for $i=1 \ldots n)$. If $c[n]$ is a self-signed certificate (i.e., subcase 2), a chain of emulated certificates $c'[1], c'[2], \ldots c'[n]$ is created such that $c'[i]$ is signed with $c'[i+1]$, for $i=1 \ldots n-1$. Further, the $c'[i]$ "Issuer" is equal to $c'[i+1]$ "Subject" for $i=1 \ldots n-1$. Emulated certificate $c'[i]$ has an embedded blob of $c[i]$, for $i=1 \ldots n$. The last emulated certificate in the emulated certificate chain is signed by a self-signed CA certificate C'.

If $c[1]$ is self-signed (i.e., subcase 2, n=1), $c'[1]$ preserves the "Validity", Subject" and "Subject Alternative Name" fields of $c[1]$, but the $c'[1]$ "Issuer" is equal to the "Subject of C". Otherwise, $c'[1]$ preserves the "Validity", "Subject", "Subject Alternative Name" and "Issuer" fields, with the exception that the organization name in the "Issuer" of $c[1]$ is preserved with the addition of a "ProxyName:" prefix, where "ProxyName" refers to a name of the proxy.

Suppose Issuer (and Subject) were an X.501 type Name. The Name describes a hierarchical name composed of attributes, such as country name, and corresponding values, such as US.

For example, suppose the Issuer (or Subject) in $c[1]$ were as follows:
CN=VeriSign Class 3 Extended Validation SSL SGC CA
OU=Terms of use at <Verisign URL>
OU=VeriSign Trust Network
O=VeriSign, Inc.
C=US The organization name in this example Issuer is "VeriSign, Inc." According to the modification described above, the organization name in the Issuer is preserved with the addition of the "ProxyName:" prefix. The Issuer (or Subject) of the emulated certificate $c'[1]$ becomes:
CN=VeriSign Class 3 Extended Validation SSL SGC CA
OU=Terms of use at <Verisign URL>
OU=VeriSign Trust Network
O=ProxyName: VeriSign, Inc.
C=US Alternatively, if the organization name of the Issuer field of $c[1]$ were not present, an organization name would be added in the Issuer of the emulated certificate and would be set to "ProxyName".

For example, suppose the Issuer (or Subject) in $c[1]$ were as follows:
CN=VeriSign Class 3 Extended Validation SSL SGC CA
OU=Terms of use at <Verisign URL>
OU=VeriSign Trust Network
C=US The Issuer (or Subject) in the emulated certificate $c'[1]$ would become:
CN=VeriSign Class 3 Extended Validation SSL SGC CA
OU=Terms of use at <Verisign URL>
OU=VeriSign Trust Network
O=ProxyName
C=US For subcase (1): $i=2 \ldots n$; subcase (2): $i=2 \ldots n-1$, $c'[i]$ preserves the "Validity" and "Subject Alternative Name" fields of $c[i]$; and the $c'[i]$ "Subject" and "Issuer" are preserved with the addition of a "ProxyName:" prefix to the organization name in the "Subject" and "Issuer", similar to the description above. For subcase (1), $c'[n+1]$ has the "Subject" field equal to the "Issuer" field of $c'[n]$, and $c'[n+1]$ has the "Issuer" field equal to "Subject" field of C'. For subcase (2) and n>1, $c'[n]$ has the "Subject" field equal to the "Subject" field of c'[n−1], and c'[n] has the "Issuer" field equal to the "Subject" field of C'.

Figure 9:
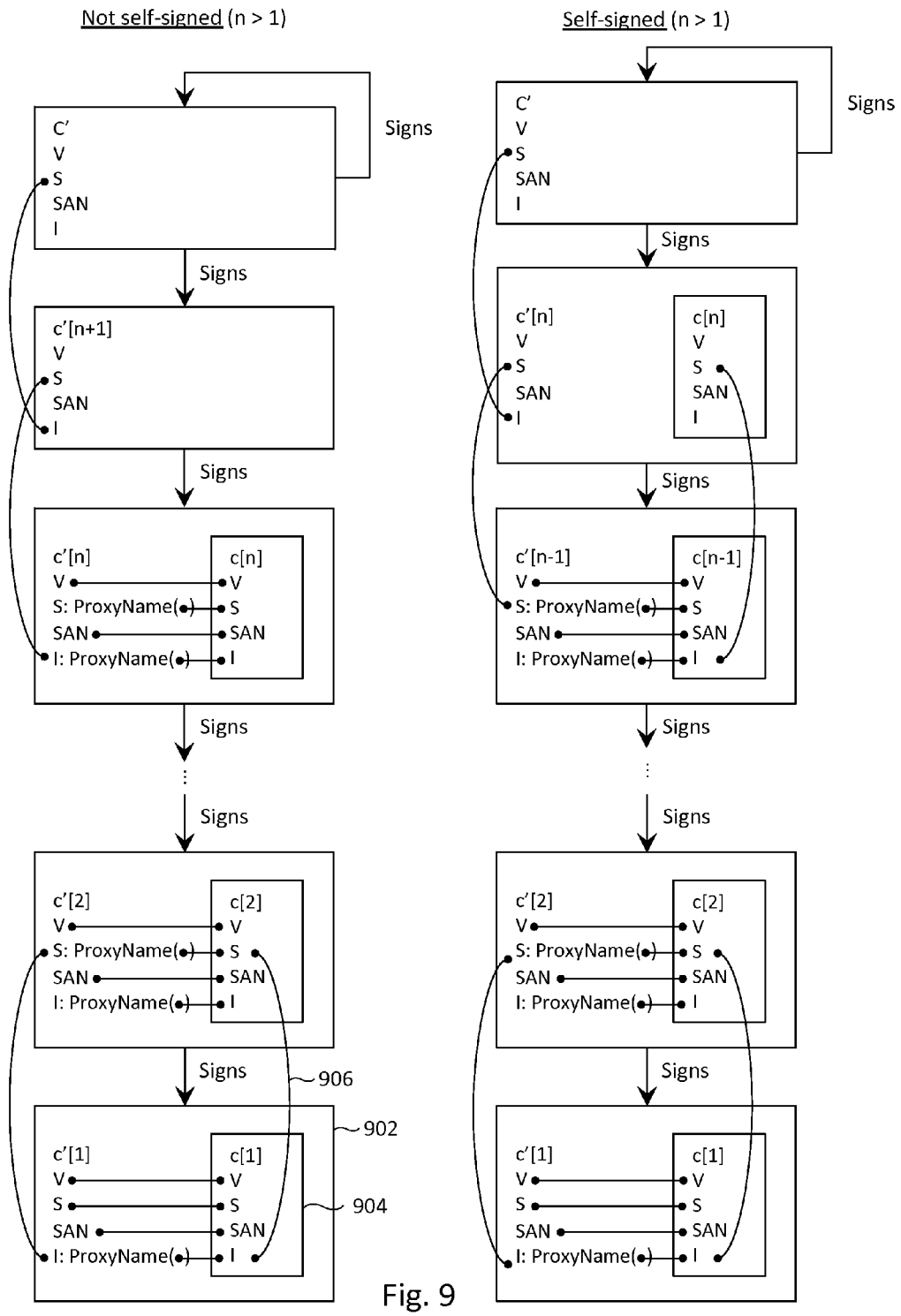
FIGS. 9 and 10 depict an emulated certificate chain that also has embedded certificates, in accordance with one embodiment of the invention.
Figure 10:
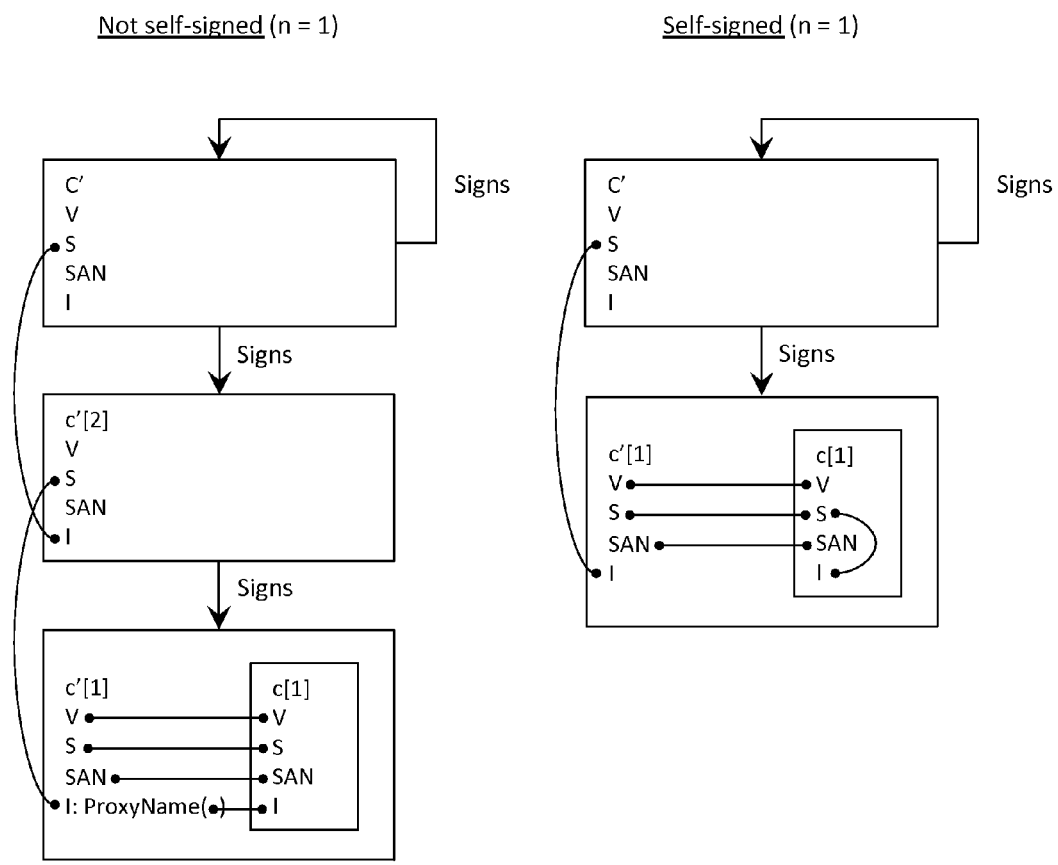
Figure 11:
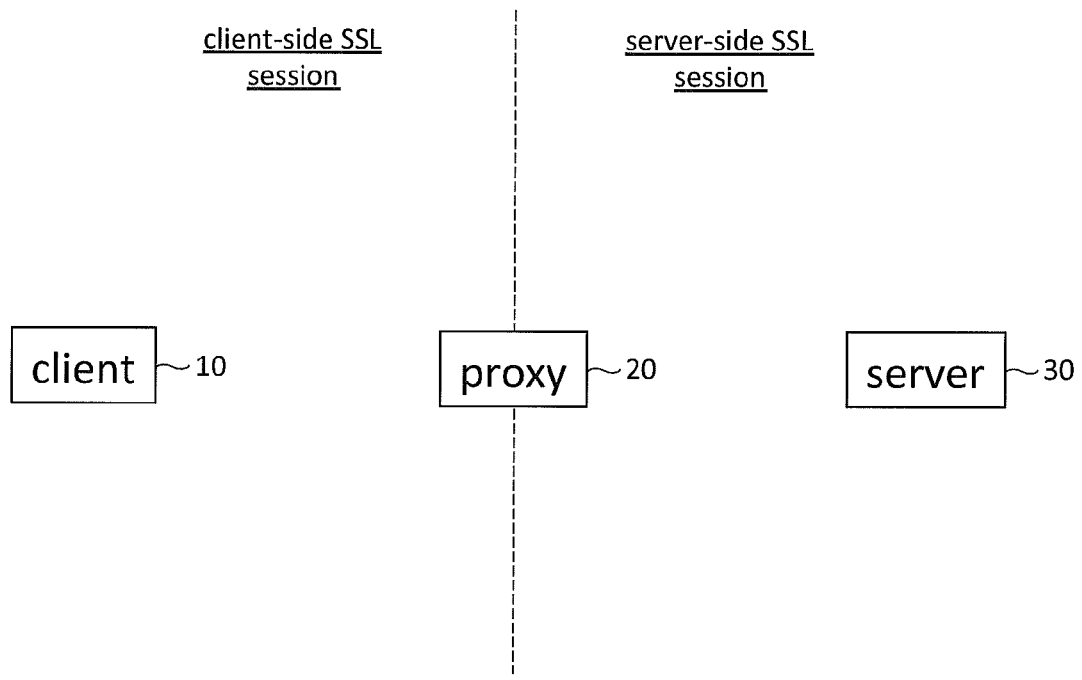
FIG. 11 depicts an SSL connection between a client and server that has been broken into a client-side SSL session and a server-side SSL session by disposing a proxy between the client and server.

The above-described construction of an emulated certificate chain with embedded certificates (i.e., not self-signed embodiment and self-signed embodiment) for n>1 is illustrated in FIG. 9. The above-described construction of an emulated certificate chain with embedded certificates (i.e., not self-signed embodiment and self-signed embodiment) for n=1 is illustrated in FIG. 10. The "Validity", "Subject", "Subject Alternative Name" and "Issuer" fields have been abbreviated as "V", "S", "SAN" and "I", respectively, for conciseness. For clarity, in FIG. 9, one instance of an emulated certificate has been labeled as 902; one instance of an embedded certificate has been labeled as 904; and one instance of a curved line indicating equality of fields has been labeled as 906.

In the instance where a client device does not properly validate the server certificate chain and the browser of the client device does not support proxy certificate validation, the fields of the emulated certificate chain may still provide the user of the client device with partial information regarding the server certificate chain. The fields of the emulated certificate chain may be decoded and presented to the user by the browser of the client device.

The discussion above has not particularly addressed the outcome if a certificate fails a verification step. In one embodiment, if a certificate cannot be verified/validated, the SSL handshake is immediately terminated and no connection through the proxy is established, while in other embodiments, a direct connection may be established between the client and server.

Thus, methods and systems for exchanging digital certificates in a client-proxy-server network configuration have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for providing a client certificate from a proxy to a server, the proxy communicatively coupled between a client and the server, the method comprising:
   configuring at the proxy a collection of one or more client certificates and one or more client private keys, each client certificate corresponding to a client private key;
   defining a policy at the proxy which selects one of the client certificates based on information associated with an identity of the client;
   in response to a request from the server to the proxy to authenticate the identity of the client, selecting one of the client certificates based on the defined policy; and
   transmitting the selected client certificate from the proxy to the server.

2. The method of claim 1, wherein one of the client certificates is selected further based on one or more of a group that the client belongs to, a URL of the server, a network address of the server, and field values of a server certificate.

3. The method of claim 1, wherein one of the client certificates is selected further based on a user group associated with the client.

4. The method of claim 1, further comprising securely sending one or more client certificates and their associated private keys from the client to the proxy.

5. A method for providing a client certificate from a proxy to a server, the proxy communicatively coupled between a client and the server, the method comprising:
   authenticating an identity of the client at the proxy;
   configuring at the proxy a collection of one or more client certificates and one or more client private keys, each client certificate corresponding to a client private key;
   defining a policy at the proxy which selects one of the client certificates based on information associated with the identity of the client;
   receiving at the proxy a request from the client to connect to the server;
   transmitting a request from the proxy to the server to establish a connection between the proxy and the server;
   providing from the proxy to the client an emulated server certificate to allow man-in-the-middle interception;
   in response to a request from the server to authenticate the identity of the client, selecting one of the client certificates based on the defined policy; and
   transmitting the selected client certificate from the proxy to the server.

6. A method for providing an emulated server certificate from a proxy to a client, the proxy communicatively coupled between the client and a server, the method comprising:
   in response to a request from the client to the proxy to authenticate an identity of the server, sending a request from the proxy to the server for a server certificate, which binds a public key of the server with the identity of the server;
   generating a key pair having a private key and public key;
   generating an emulated server certificate based on the server certificate, the emulated server certificate containing the public key generated at the proxy instead of the public key of the server;
   embedding the server certificate in a field within the emulated server certificate;
   signing the emulated server certificate; and
   transmitting the emulated server certificate from the proxy to the client.

7. The method of claim 6, wherein the server certificate is embedded in an nsComment field of the emulated server certificate.

8. The method of claim 7, further comprising the client verifying an identity of the proxy via the emulated server certificate and verifying the identity of the server via the embedded server certificate.

9. A method for providing an emulated client certificate from a proxy to a server, the proxy communicatively coupled between a client and the server, the method comprising:
   in response to a request from the server to the proxy to authenticate an identity of the client, sending a request from the proxy to the client for a client certificate, which binds a public key of the client with the identity of the client;
   generating a key pair having a private key and public key;
   generating an emulated client certificate based on the client certificate, the emulated client certificate containing the public key generated at the proxy instead of the public key of the client;
   embedding the client certificate in a field within the emulated client certificate;
   signing the emulated client certificate; and
   transmitting the emulated client certificate from the proxy to the server.

10. The method of claim 9, wherein the client certificate is embedded in an nsComment field of the emulated client certificate.

11. The method of claim 9, further comprising the server verifying an identity of the proxy via the emulated client certificate and verifying the identity of the client via the embedded client certificate.

* * * * *